2,705,224
Patented Mar. 29, 1955

2,705,224

ANTI-OZIDANTS

Edward L. Hill, Rock Island, Edwin R. Erickson, Moline, and Robert A. Berntsen, Rock Island, Ill., assignors to Augustana Research Foundation, Rock Island, Ill., a corporation of Illinois No Drawing. Application June 19, 1953, Serial No. 362,964

20 Claims. (Cl. 260—28.5)

This invention relates to the preservation of rubber, and more particularly, to new rubber preservative compounds and compositions, which when incorporated in rubber tend to inhibit deterioration of rubber due to the action of heat, light and oxidation, and specifically due to the action of ozone.

As used herein the term "rubber" means solid resinous elastomer either natural or synthetic. As will be appreciated, the chemical structures of rubbers vary in certain respects, and rubber preservative compounds which might operate successfully with one given type of rubber may not function equally well with another given type of rubber. Heretofore, those skilled in the art have referred to rubber preservatives of the general class hereinbefore indicated as "antioxidants," assuming that the oxidation deterioration of the rubber was brought about primarily by the presence of oxygen in the air. The instant invention, however, is based upon the discovery that ozone, which is ordinarily present in the air in only very small amounts, is a very critical factor in the rubber deterioration picture; and the instant invention is also based on the discovery of certain compounds which are effective "antiozidants" or compounds which effectively neutralize the deterioration effect of ozone.

As has been explained, a given antioxidant may be relatively effective with a given type of rubber, such as natural rubber, even though this antioxidant is only slightly or perhaps even not appreciably effective as an antioxidant for GR–S rubber. Also, it has been found that antioxidants which are particularly effective for a given type of rubber are substantially ineffective as antiozidants for this given type of rubber, and vice versa. It will thus be seen that the prior workers in the art having failed to appreciate the necessity for both the antioxidant and the antiozidant functions in rubber preservation have been unable to offer a satisfactory solution to the rubber deterioration problem. In fact, the prior workers in the art had failed to appreciate the existence of the antiozidant function as such in the preservation of rubber and thus failed to comprehend completely the overall nature of rubber deterioration.

It is, therefore, an important object of the instant invention to provide an improved rubber preservative compound and/or composition.

Another important object of the instant invention is to provide rubber having incorporated therein, as an antiozidant, (*a*) a compound having the formula:

$$R{-}NH{-}A{-}NH{-}\left[{-}X{-}NH{-}A{-}NH{-}\right]_x{-}R$$

wherein $x$ is an integer from 1 to 30, each A is an arylene radical having from 1 to 2 benzene nuclei, each R is a $C_3$–$C_6$ alkyl radical and each X is a $C_2$–$C_{10}$ alkylene radical, and to provide a novel antiozidant in the form of the instant compound per se.

A more specific object of the instant invention is to provide butadiene-styrene copolymeric elastomer having incorporated therein, as an antiozidant, (*a*) a compound having the formula:

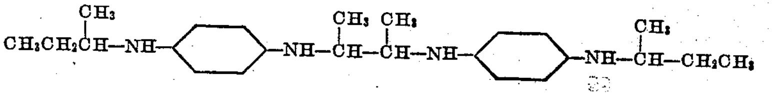

(*b*) wax and (*c*) an antioxidant having the formula:

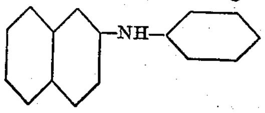

and the weight ratios of (*a*):(*b*):(*c*) being to 1 to 2:1 to 2:1 to 2 and (*a*) plus (*b*) plus (*c*) equalling 5% of the elastomer.

Other objects, features and advantages of the instant invention will become apparent to those skilled in the art from the following detailed disclosure of preferred embodiments thereof.

The instant invention is based upon the discovery that certain new compounds having repeating arylene diimino groups therein are uniquely superior for use as antiozidants in rubber and for use in combination with wax and/or antioxidants in rubber compositions. These compounds have the following general formula:

$$R{-}NH{-}A{-}NH{-}\left[{-}X{-}NH{-}A{-}NH{-}\right]_x{-}R$$

wherein $x$ is an integer from 1 to 30, each A is an arylene radical having from 1 to 2 benzene nuclei, each R is a $C_3$–$C_6$ alkyl radical and each X is a $C_2$–$C_{10}$ alkylene radical. Each alkyl radical "R" may thus be a propyl, butyl, amyl or hexyl radical (as the n-, iso, sec. or tert. form); but preferably both R's are the same and are sec. alkyl radicals. Most preferably, each R is sec. butyl which has been found to yield particularly superior results in GR–S rubber.

The arylene radical "A" is, of course, a divalent aromatic radical which has 1 to 2 benzene nuclei, viz., phenylene, biphenylene and naphthylene. If 2 benzene nuclei are present, preferably, the benzene nuclei are non-condensed as in the biphenylene radical. The imino (or sec. amine —NH—) substituents on the radical "A" are attached to different benzene nuclei, if more than one benzene nucleus is used in the radical "A," and most preferably in a "para" arrangement as follows:

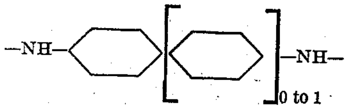

as in the 4,4' biphenylene diimino or the para-phenylene diimino groups. This structure is not only the most easily produced but also imparts to the compound the most advantageous antiozidant characteristics.

The alkylene radical "X" is a divalent saturated aliphatic radical having from two to ten carbon atoms, and preferably from four to ten carbon atoms in a structure such as:

$$\begin{array}{cc} R' & R'' \\ | & | \\ {-}CH{-} & CH{-} \end{array}$$

wherein R' and R'' are each alkyl radicals such as methyl, ethyl, propyl, butyl, etc. As will be explained hereinafter, the preferred reactant for forming this structure is diacetyl which results in the formation of the 1,2 dimethyl ethylene structure, as follows:

$$\begin{array}{cc} CH_3 & CH_3 \\ | & | \\ O{=}C{-} & C{=}O \end{array} \longrightarrow \begin{array}{cc} CH_3 & CH_3 \\ | & | \\ {=}C{-} & C{=} \end{array} \longrightarrow \begin{array}{cc} CH_3 & CH_3 \\ | & | \\ {-}CH{-} & CH{-} \end{array}$$

The three most effective antiozidants of the invention are:

N,N' - bis(p - sec. butylaminophenyl) - 2,3-butanediamine—

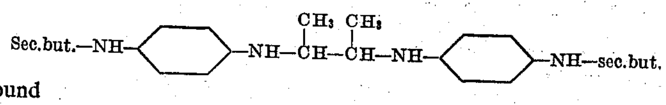

N,N' - bis(p - sec. butylaminobiphenyl) - 2,3-butanediamine—

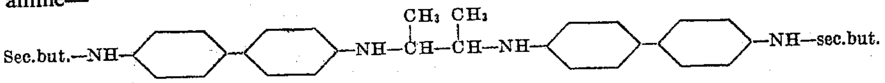

and the polymer

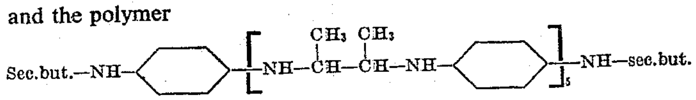

In the first two compounds "$x$" is one; and in the polymer "$x$" is more than one.

In the preparation of the antiozidants of the invention, the characteristic reactions involved may be represented as follows:

(1)

$$-NH_2 + O{=}\overset{|}{C}{-}CH \xrightleftharpoons{-H_2O} -N{=}\overset{|}{C}{-}CH \xrightleftharpoons{H_2} -NH{-}\overset{|}{C}H{-}CH<$$

(2)

$$-NO_2 \xrightarrow[-2H_2O]{2H_2} -NH_2 + O{=}\overset{|}{C}{-}CH \xrightleftharpoons[-H_2O]{} -N{=}\overset{|}{C}{-}CH< \xrightarrow{H_2} -NH{-}\overset{|}{C}H{-}CH<$$

As will be seen Reaction 2 involves initial reduction of $-NO_2$ to $-NH_2$ and is, otherwise, similar to Reaction 1; each of such reactions involving a compound containing the keto structure:

$$O{=}\overset{|}{C}{-}CH\langle$$

A typical reaction for the preparation of the polymer and/or the first of the above mentioned preferred compounds may be represented, as follows:

(3)

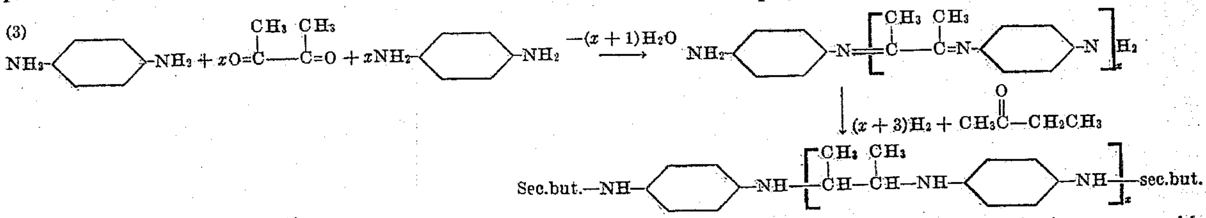

As will be appreciated, if $x$ is one, then the theoretical yield will be only the N,N'-bis(p-sec. butylaminophenyl)-2,3-butanediamine and no polymer would be obtained. It has been found, however, that a mixture of monomer and polymers is obtained even when it is one or less; but the monomer may be separated out. Polymers when $x$ is as high as 30 may be obtained, but the production of such polymers is limited to their solubility in that they tend to precipitate out of the reaction mass so as to prevent the reaction from going to completion.

Actually, the reaction is carried out in a hydrogen atmosphere at 500 to 2000 lbs. per square inch pressure and at temperatures of 130–180° C. in the presence of a reducing catalyst, during the last of the process steps above described.

For example, substantially equimolecular portions of diacetyl and p-phenylenediamine are condensed in boiling ethanol to form a mixture of poly Schiff bases, which separates from the ethanol as an olive-green solid which does not melt at 325° C.; the average "$x$" in this mixture is about 10. The product (26.6 g.) plus 185 ml. of methyl ethyl ketone and 7 g. of catalyst (CuO, $Cr_2O_3$ and BaO) is charged into a Parr hydrogenator which in turn is charged with hydrogen at 1000 lbs. per square inch (25° C.) and reaction (according to the above Equation 3) takes place at 150–165° C. The reaction product was removed, filtered to separate out the catalyst and subjected to reduced pressure distillation to separate out unreacted and/or reduced ketone. The product is a thermoplastic resinous material.

The phenylene monomer (i. e. the first of the above preferred compounds) is made by carrying out the same reaction steps except that 2 mols of p-phenylenediamine are used for each mol of diacetyl. The benzidine analogues are prepared accordingly also by using benzidine in place of p-phenylenediamine.

As previously mentioned, the foregoing reaction leads to monomer-polymer mixtures; but the monomer may be prepared in more pure form by the following reaction sequence:

(4)

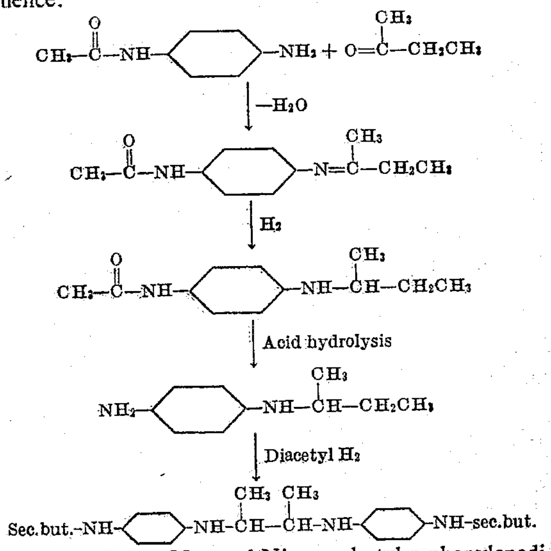

For example, N-acetyl-N'-sec. butyl-p-phenylenediamine is prepared by charging a Parr hydrogenator with 75 g. of p-aminoacetanilide, 200 ml. of methyl ethyl ketone, 20 g. of the catalyst above described, and hydrogen at 1200–1575 lbs. per square inch and using a temperature of 130–160° C. for 5½ hours. The catalyst is removed by filtration and excess ketone is removed by distillation and the residue is poured into water, and recrystallized from water-alcohol to yield silver plates melting at 86–87° C. Acid hydrolysis to yield N-sec. butyl-p-phenylenediamine is followed by neutralization, ether extraction and distillation to give a yellow liquid product that boils at 121.5–122° C. at 3 mm. of Hg and turns red upon exposure to air and light. This product (N-sec. butyl-p-phenylenediamine, 0.225 mol or 37 g.) is then charged in the Parr hydrogenator with 9.63 g. (0.112 mol) of diacetyl, 10 g. of catalyst, 125 ml. of benzene and hydrogen at 1000–1475 lbs. per square inch, using 2½ hours and 140–170° C. temperature, to obtain the final product: N,N'-bis(p-sec. butylaminophenyl)-2,3-butanediamine, which is purified in the usual manner to yield an amber viscous liquid boiling at 193–195° C. at 3 mm. of Hg. The biphenylene analogue is prepared by carrying out the same process except that N-acetylbenzidine is used in place of N-acetyl-p-phenylenediamine.

In place of the diacetyl, other "di-keto" compounds may be used, and preferably vicinal diketones are used. Such compounds that may be used include 2,3-pentanedione, 2,3-hexanedione, 2,7-octanedione, etc. to 2,9-decanedione.

In place of methyl ethyl ketone, the keto compound may be acetone, diethyl ketone, ethyl propyl ketone, methyl propyl ketone, methyl butyl ketone, etc.

The advantageous aspects of the present invention are more clearly demonstrated from the following formulation:

| Formulation I: | Parts by weight |
|---|---|
| GR–S rubber (90% butadiene-10% styrene copolymeric elastomer) | 100 |
| Carbon black | 50 |
| Stearic acid | 2 |
| Zinc oxide | 10 |
| Sulfur | 1.75 |
| N - cyclohexyl-2-benzothiazyl-sulfenamide, accelerator | 1 |
| N-phenyl-B-naphthalamine, antioxidant | 1 |
| Di-tolylamine, antioxidant | 1 |
| Microcrystalline wax | 1 |
| Antiozidant (N,N' - bis.(p - sec. butylaminophenol)-2,3-butanediamine) | 2 |

Stocks made from Formulation I are vulcanized to a comparable state of cure and subjected to a standard (air) oxidation test in a Geer oven and also subjected to exposure under stress of 20% elongation to atmosphere (100° F.) containing 25 p. p. h. m. (parts per hundred million) of ozone to determine the antiozidant characteristics. The oven temperature is 70° C.; and the original tensile of the stock is 2400; the tensile after 7 days in the Geer oven is 2400; and the tensile after 7 days' exposure to the "ozone" atmosphere of 2400. Other stocks are subjected to outdoor weathering conditions, under stress of 20% elongation of the rubber, and as bent loop samples, and these stock have withstood as much as 8 months under such storage conditions without showing the typical cracks developed as a result of ozone deterioration (whereas stock not containing the instant antiozidant show noticeable cracks in one day under identical storage conditions).

Several rather unique aspects of the instant invention have been observed during the testing of stocks such as the above stocks as well as stocks containing other antiozidants of the instant invention. For example, it has been found that a unique synergistic effect is obtained by the combination of the instant antiozidant and wax. If the antiozidant is not used and only the wax is incorporated in a formulation such as the above Formulation I, the antiozidant effect obtained is negligible, thereby indicating that neither the wax nor the antioxidant (alone or in combination) is capable of obtaining effective antiozidant properties in the stock. On the other hand, if the wax and not the antiozidant is omitted from a formulation such as the above, it is found that the antiozidant properties are much less effective than those above indicated. This latter observation demonstrates clearly that the wax plays a very important part in the antiozidant picture, although the wax per se is not effective as an antiozidant. The instant antiozidants are, of course, effective as such in the absence of wax, but an important aspect of the instant invention resides in the fact that the presence of the wax makes the instant antiozidants many fold more effective.

Waxes are a well known group of ingredients which, in general, are solids that are far too soft for structural purposes but are considered to be hard and non-greasy to the touch. Waxes may be dispersed readily in the rubber composition during compounding; and waxes have the additional advantage that they may be used to form a preliminary intimate mixture of the instant antiozidant and wax, which mixture may be used to effect more rapid and complete dispersion of the two ingredients in the rubber during compounding. Also, it appears that the wax tends to preserve the antiozidant characteristics of the instant antiozidants, if the two materials are stored in the form of an intimate mixture thereof. In general, the weight ratio of antiozidant to wax should be from 1:10 to 10:1, and more preferably from 1:2 to 2:1. Another peculiar aspect of the instant antiozidant-wax combination is that the amount of wax used in order to obtain maximum effectiveness may be as little as approximately the weight of the antiozidant (and one-half the weight is preferred), whereas the use of wax for dispersing various other ingredients is usually assumed to involve amounts of wax that are many times the weight of the ingredient to be dispersed. Paraffin waxes are preferred, and microcrystalline waxes most preferred for use in the invention.

Still another important aspect of the instant invention involves the use of the antioxidant in combination with the instant antiozidants. If the antioxidants are excluded from the above identified formulation, it will be found that the antioxidant characteristics of the stock are reduced, thereby clearly indicating the substantial ineffectiveness of the instant antiozidant (in the relatively small proportion used) as an antioxidant. It has been found that the instant antiozidants are substantially ineffective as antioxidants in practically all kinds of rubber; whereas any particular antioxidant which is effective in a given type of rubber, as an antioxidant, is substantially ineffective in such rubber as an antioxidant. Antiozidants for rubber were not heretofore recognized as a class of compounds; whereas antioxidants (of a great number of different types of compounds, many of which include amines) have been known for one or more different types of rubber. In general, the antiozidants of the instant invention are used in the same or somewhat smaller proportions by weight than the known antioxidants are used in a similar rubber composition. In fact, the instant antiozidants are preferably employed in weight proportions of about 1 to 2 parts per 100 parts of rubber (although 1–5 parts may be used); whereas antioxidants are usually employed in quantities of at least about 2 parts per 100 parts of rubber, in order to obtain effective antioxidant action. In the instant invention, the antiozidants per se are not appreciably effective antioxidants, nor are they used in quantities sufficient to obtain any appreciable antioxidant effect, in the preferred formulations embodying the instant invention.

Subject to the above mentioned disclosure concerning the proportions used, the weight ratio of antiozidant to antioxidant may range from as much as 1:10 to 10:1, but the preferred range is about 1:2 to 2:1. As shown in the above Formulation I, the most preferred proportion is 1:1.

As has been pointed out, antioxidants are known for use in rubber; and the instant invention contemplates the use of any of the known antioxidants for a given type of rubber, in combination with the instant antiozidants preferably, the antioxidants employed are substituted amines, such as the diaryl amines (which are secondary amines), which contain a total of 2 to 3 benzene nuclei in the molecule. Particularly satisfactory diaryl amine antioxidants include:

N-phenyl-B-naphthalamine—

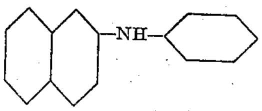

and di-tolylamine (or homologues thereof)—

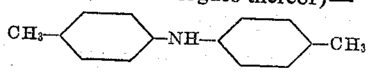

If a demonstration is carried out such as that hereinbefore described except that N,N'-bis(p-sec. butylaminobiphenyl)-2,3-butanediamine is used instead of the N,N'-bis(p-sec. butylaminophenyl)-2,3-butanediamine substantially the same results are obtained. This compound has the advantage that it is less volatile than its phenylene analogue. Other compounds such as the isopropyl analogues are also effective as antiozidants to substantially the same extent. Also, the polymer (whose preparation is specifically described herein) is equally effective. The higher analogues such as the amyl, sec. amyl, sec. hexyl, etc. and the alkylene higher analogues such as the amylene, hexylene, etc. to the decylene compounds are more expensive to make and are in most cases less effective presumably because of the greater amount of relatively inert hydrocarbon structure in the molecule. This explanation is based on the theory that the effectiveness of the instant antiozidants is dependent at least in part to the particular positioning of the —NH— group with respect to the benzene nucleus (to permit quinoid formation) and with respect to the alkyl group. The —NH— groups are thus preferably para (or ortho); and preferably attached to non-condensed benzene nuclei. Thus the naphthylene analogues are effective antiozidants, but substantially less effective than the phenylene and biphenylene analogues.

If a type of rubber other than GR–S is employed in the foregoing formulations, a distinct antiozidant effect is obtained using the antiozidants of the instant invention, but the antiozidant effect obtained is not always as clearly superior as that obtained using GR–S rubber, which is the preferred rubber for use in the instant invention. This indicates that the instant antiozidants are particularly superior as such when used in the polybutadiene (synthetic) rubbers, and particularly in the butadiene-styrene copolymeric elastomer known by the trade name "GR–S Rubber." The polybutadiene rubbers are a well known class of synthetic rubbers which comprise essentially polymerized butadiene and also contain a relatively small amount (i. e., about 10%) of a copolymer, such as the styrene or the acrylonitrile copolymers. The polybutadiene rubbers have been found to be particularly useful in connection with the instant antiozidants. Also, the instant antiozidants are effective as such with other elastomers or rubbers, including natural rubber. The effectiveness of the instant antiozidant will, of course, depend to a certain extent upon the amount used, although it will be appreciated that excessive amounts of the instant antiozidant cannot be used as a practical matter. The total amount of antiozidant plus wax plus antioxidant is about 2–10% of the elastomer, and preferably about 5% of the elastomer. (As used herein, the terms "parts" and "percent" mean parts and percent by weight, unless otherwise designated.) It will be appreciated that somewhat larger as well as somewhat smaller amounts of these ingredients may be used, but appreciably larger amounts would be impractical from a cost point of view and also might cause interference with the functioning of other materials in the rubber such as the fillers. On the other hand, the use of substantially smaller amounts, except in the case of extremely reactive ingredients with respect to the particular rubber being used, might well result in insufficiently effective antiozidant-antioxidant characteristics. In connection with the proportion of the antiozidant plus the wax, it is found that about 1–5% of the elastomer is the preferred range, and the most preferred proportion is about 3%. These latter proportions are also the effective proportions for the antiozidant alone (in the absence of wax), since it is necessary to use more antiozidant, if wax is not used, in order to obtain a comparable effect.

As has been previously indicated, it is advantageous to obtain a preliminary mixture or dispersion of the instant antiozidants in another ingredient to be used therewith, such as the wax, prior to using the instant antiozidant in the rubber compounding operation. The instant antiozidant may also be preliminarily admixed with the antioxidants of the invention, in the proportions in which these ingredients will be used in the final rubber compounding; but it has been found to be particularly advantageous to admix all three ingredients, namely, the antiozidant, the antioxidant and the wax (in the proportions hereinbefore indicated), so that the resulting mixture may be made up at the point of manufacture of the instant antioxidants and antiozidants and then shipped to the location of the rubber compounding operation. In the cases of particularly difficultly dispersed antoxidants and/or antiozidants, it has also been found advantageous to carry out a preliminary admixing operation (e. g., in a ball mill) with zinc oxide and/or carbon black, which are used as fillers in the rubber. The active ingredients (antiozidant, antioxidant and/or wax) are thus intimately admixed in 2 to 4 times their weight of such filler material so as to obtain a mixture which may be readily compounded with the rubber.

It will be understood that modifications and variations may be effected without departing from the scope of the novel concepts of the present invention.

We claim as our invention:

1. Rubber having incorporated therein, as an antiozidant, (*a*) a compound having the formula:

$$R-NH-A-NH-\left[-X-NH-A-NH-\right]_x-R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical.

2. Butadiene rubber having incorporated therein, as an antiozidant, (*a*) a compound having the formula:

$$\text{Sec.-alkyl}-NH-A-NH-\underset{}{CH(CH_3)}-CH(CH_3)-NH-A-NH-\text{sec.alkyl}$$

wherein each A is an arylene radical consisting of from 1 to 2 unsubstituted benzene nuclei and the sec.-alkyl radicals each have three to four carbon atoms.

3. Butadiene-styrene copolymeric elastomer having incorporated therein, as an antiozidant, (*a*) a compound having the formula:

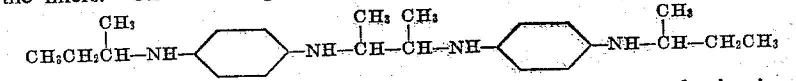

4. Butadiene-styrene copolymeric elastomer having incorporated therein, as an antiozidant, (*a*) a compound having the formula:

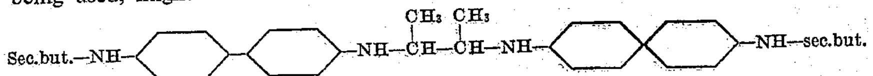

5. Butadiene-styrene copolymeric elastomer having incorporated therein, as an antiozidant, (*a*) a compound having the formula:

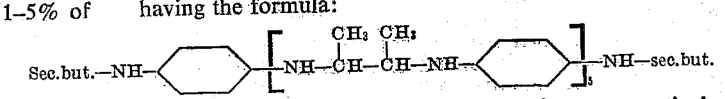

6. Rubber having incorporated therein, as an antiozidant, (*a*) a compound having the formula:

$$R-NH-A-NH-\left[-X-NH-A-NH-\right]_x-R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical and (*b*) wax; the weight ratio of (*a*):(*b*) ranging from 1:10 to 10:1.

7. Butadiene-styrene copolymeric elastomer having incorporated therein, as an antiozidant, (*a*) a compound having the formula:

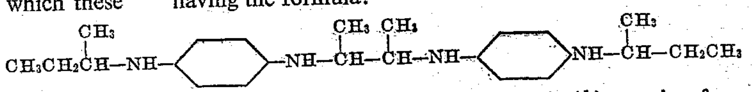

and (*b*) wax; the weight ratio of (*a*):(*b*) ranging from 1:10 to 10:1.

8. Butadiene-styrene copolymeric elastomer having incorporated therein, as an antiozidant, (*a*) a compound having the formula:

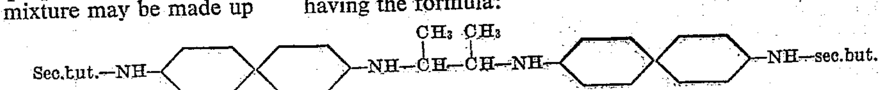

and (*b*) wax; the weight ratio of (*a*):(*b*) ranging from 1:10 to 10:1.

9. Butadiene-styrene copolymeric elastomer having incorporated therein, as an antiozidant, (*a*) a compound having the formula:

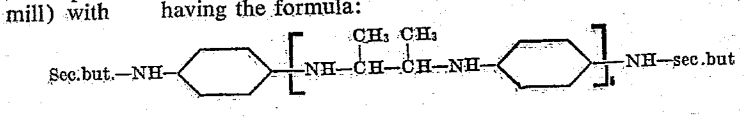

and (*b*) wax; the weight ratio of (*a*):(*b*) ranging from 1:10 to 10:1.

10. A compound having the formula:

$$R{-}NH{-}A{-}NH{-}\left[{-}X{-}NH{-}A{-}NH{-}\right]_x{-}R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical.

11. A compound having the formula:

$$\text{Sec.alkyl}{-}NH{-}A{-}NH{-}\underset{}{\overset{CH_3}{\overset{|}{C}H}}{-}\overset{CH_3}{\overset{|}{C}H}{-}NH{-}A{-}NH{-}\text{sec.alkyl}$$

wherein each A is an arylene radical consisting of from 1 to 2 unsubstituted benzene nuclei and the sec.-alkyl radicals each have three to four carbon atoms.

12. N,N′-bis(p-sec. butylaminophenyl)-2,3-butanediamine.

13. N,N′-bis(p-sec. butylaminobiphenyl)-2,3-butanediamine.

14. A compound having the formula:

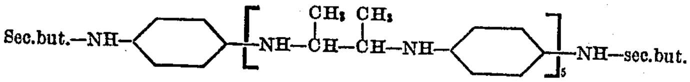

15. As an antiozidant composition for incorporation in rubber as a preservative therefor, an intimate mixture of (*a*) a compound having the formula:

$$R{-}NH{-}A{-}NH{-}\left[{-}X{-}NH{-}A{-}NH{-}\right]_x{-}R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical and (*b*) wax; the weight ratio of (*a*):(*b*) ranging from 1:10 to 10:1.

16. As an antiozidant-antioxidant composition for incorporation in rubber as a preservative therefor, an intimate mixture of (*a*) a compound having the formula:

$$R{-}NH{-}A{-}NH{-}\left[{-}X{-}NH{-}A{-}NH{-}\right]_x{-}R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical (*b*) wax and (*c*) an antioxidant other than the compound (*a*); the weight ratio of (*a*):(*b*):(*c*) being 1 to 10:1 to 10:1 to 10.

17. Rubber having incorporated therein, as an antiozidant-antioxidant, (*a*) a compound having the formula:

$$R{-}NH{-}A{-}NH{-}\left[{-}X{-}NH{-}A{-}NH{-}\right]_x{-}R$$

wherein $x$ is an integer from 1 to 30, each A is an arylene radical consisting of from 1 to 2 unsubstituted benzene nuclei, each R is a $C_3$–$C_6$ alkyl radical and each X is a $C_2$–$C_{10}$ alkylene radical (*b*) wax and (*c*) an antioxidant other than the compound (*a*); the weight ratio of (*a*):(*b*):(*c*) being 1 to 10:1 to 10:1 to 10.

18. Butadiene rubber having incorporated therein, as an antiozidant-antioxidant, (*a*) a compound having the formula:

$$\text{Sec.alkyl}{-}NH{-}A{-}NH{-}\overset{CH_3}{\overset{|}{C}H}{-}\overset{CH_3}{\overset{|}{C}H}{-}NH{-}A{-}NH{-}\text{sec.alkyl}$$

wherein each A is an arylene radical consisting of from 1 to 2 unsubstituted benzene nuclei and the sec.-alkyl radicals each have three to four carbon atoms (*b*) wax and (*c*) a diarylamine antioxidant other than the compound (*a*); the weight ratio of (*a*):(*b*):(*c*) being 1 to 10:1 to 10:1 to 10.

19. Butadiene-styrene copolymeric elastomer having incorporated therein, as an antiozidant, (*a*) a compound having the formula:

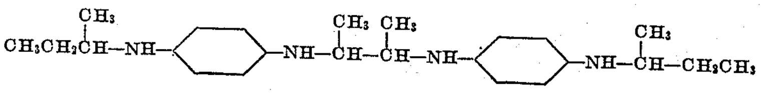

(*b*) wax and (*c*) an antioxidant having the formula:

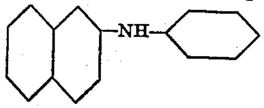

and the weight ratios of (*a*):(*b*):(*c*) being 1 to 2:1 to 2:1 to 2 and (*a*) plus (*b*) plus (*c*) equalling 2–10% of the elastomer.

20. Butadiene-styrene copolymeric elastomer having incorporated therein, as an antiozidant, (*a*) a compound having the formula:

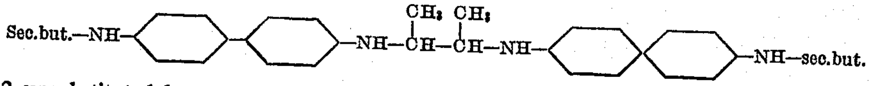

(*b*) wax and (*c*) an antioxidant having the formula:

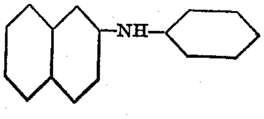

and the weight ratios of (*a*):(*b*):(*c*) being 1 to 2:1 to 2:1 to 2 and (*a*) plus (*b*) plus (*c*) equalling 2–10% of the elastomer.

References Cited in the file of this patent

UNITED STATES PATENTS 2,128,945 Jones ---------------- Sept. 6, 1938

FOREIGN PATENTS 479,919 Canada ---------------- Jan. 1, 1952